US012592610B2

(12) United States Patent
Wang et al.

(10) Patent No.: US 12,592,610 B2
(45) Date of Patent: Mar. 31, 2026

(54) FLYWHEEL ENERGY STORAGE DEVICE

(71) Applicant: Huachi Kinetic Energy (Beijing) Technology Co., Ltd, Beijing (CN)

(72) Inventors: Zhiqiang Wang, Beijing (CN); Sen Su, Beijing (CN)

(73) Assignee: Huachi Kinetic Energy (Beijing) Technology Co., Ltd, Beijing (CN)

( * ) Notice: Subject to any disclaimer, the term of this patent is extended or adjusted under 35 U.S.C. 154(b) by 278 days.

(21) Appl. No.: 18/692,471

(22) PCT Filed: Jan. 19, 2023

(86) PCT No.: PCT/CN2023/073158
§ 371 (c)(1),
(2) Date: Mar. 15, 2024

(87) PCT Pub. No.: WO2023/143375
PCT Pub. Date: Aug. 3, 2023

(65) Prior Publication Data
US 2024/0429779 A1 Dec. 26, 2024

(30) Foreign Application Priority Data
Jan. 28, 2022 (CN) .......................... 202210103796.8

(51) Int. Cl.
*H02K 7/02* (2006.01)
*H02K 5/16* (2006.01)
(Continued)

(52) U.S. Cl.
CPC ............. *H02K 7/025* (2013.01); *H02K 5/161* (2013.01); *H02K 5/207* (2021.01); *H02K 7/09* (2013.01); *H02K 9/04* (2013.01)

(58) Field of Classification Search
CPC ........ H02K 7/025; H02K 5/161; H02K 5/207; H02K 7/09; H02K 9/04; H02K 7/08; H02K 7/10; Y02E 60/16; H02J 15/30
See application file for complete search history.

(56) References Cited

U.S. PATENT DOCUMENTS 6,624,542 B1 * 9/2003 Gabrys ................. F16C 37/005
310/74
2019/0157943 A1 * 5/2019 Ge .......................... H02K 7/083

FOREIGN PATENT DOCUMENTS

CN 113315295 A 8/2021
CN 113489229 A 10/2021
CN 114123635 A 3/2022

OTHER PUBLICATIONS

International Search Report for corresponding PCT/CN2023/073158, mailed Mar. 23, 2023, 28 pages (English translation).
(Continued)

*Primary Examiner* — Thomas Truong
(74) *Attorney, Agent, or Firm* — Maginot, Moore & Beck, LLP

(57) ABSTRACT

A flywheel energy storage device includes a housing, a flywheel rotor, a first bearing, a second bearing and a limit assembly. The housing defines an installation chamber. The flywheel rotor is arranged in the installation chamber and rotatable in the installation chamber. The flywheel rotor includes a rotor portion, a first shaft portion and a second shaft portion. The first shaft portion is positioned at one side of the rotor portion, and the second shaft portion is positioned at another side of the rotor portion. The first bearing is arranged to surround an outer circumference of the first shaft portion; and the second bearing is arranged to surround an outer circumference of the second shaft portion. The limit assembly is arranged at an end of the first shaft portion or an end of the second shaft portion.

19 Claims, 3 Drawing Sheets

(51) Int. Cl.
     H02K 5/20          (2006.01)
     H02K 7/09          (2006.01)
     H02K 9/04          (2006.01)

(56)                    References Cited

OTHER PUBLICATIONS

Office Action for corresponding CN202210103796.8, mailed Mar. 9, 2023, 11 pages (English translation).

Ren Zhengyi et al., Optimization Analysis of Thrust Disk Layout of Flywheel Energy Storage System, Mechanical Manufacturing and Automation, Apr. 20, 2020, Article No. 16715276, vol. 49, No. 267, Academic Journal Electronic Publishing House, China (English translation).

* cited by examiner

FLYWHEEL ENERGY STORAGE DEVICE

CROSS-REFERENCE TO RELATED APPLICATIONS

This application a U.S. national phase application of International Application No. PCT/CN2023/073158, filed on Jan. 19, 2023, which claims priority to Chinese Patent Application Serial No. 202210103796.8, filed with the National Intellectual Property Administration of PRC on Jan. 28, 2022, the entire contents of which are incorporated herein by reference.

FIELD

The present disclosure relates to the field of energy storage technology, in particular to a flywheel energy storage device.

BACKGROUND

A flywheel energy storage system is an electromechanical energy conversion-based energy storage device. The system makes energy storage by a physical means, and realizes mutual conversion and storage between an electric energy and a mechanical kinetic energy of a high-speed operating flywheel through power-driven/power-generation reciprocal bidirectional motor. Both frequency modulation-peak shaving of power grid and electric energy storage require an energy storage flywheel with a large amount of electric quantity, the existing flywheel energy storage system however is of a low amount of stored energy in the related art, which is not convenient for use in practice.

SUMMARY

The present disclosure aims to solve at least one of the technical problems in the related art to a certain extent.

In view of the above, the present disclosure provides in embodiments a flywheel energy storage device with a characteristic of large energy storage, achieving the energy storage up to 1000 kilowatt-hours or more, and exhibits excellent load and protection capabilities in both radial and axial directions once the flywheel rotor loses stability during high-speed rotation, thus providing high safety.

In embodiments of the present disclosure, there is provided a flywheel energy storage device, including:

a housing, defining an installation chamber;

a flywheel rotor, arranged in the installation chamber and rotatable in the installation chamber, and including a rotor portion, a first shaft portion and a second shaft portion, wherein the first shaft portion is positioned at one side of the rotor portion, the second shaft portion is positioned at another side of the rotor portion, and the first shaft portion and the second shaft portion are arranged coaxially;

a first bearing, arranged at the housing and to surround an outer circumference of the first shaft portion;

a second bearing, arranged at the housing and to surround an outer circumference of the second shaft portion; and a limit assembly, arranged at an end of the first shaft portion or an end of the second shaft portion, and adapted to stop the end of the first shaft portion or the end of the second shaft portion to constrain displacement of the flywheel rotor during the flywheel rotor moving along an axial direction, wherein the limit assembly includes a first bearing cover, a second bearing cover and a third bearing, wherein the third bearing includes a first bearing ring and a second bearing ring, which are movable relative to each other, wherein one of the first bearing cover and the second bearing cover is connected to the first bearing ring, and another one of the first bearing cover and the second bearing cover is connected to the second bearing ring, and wherein one of the first bearing cover and the second bearing cover is adapted to stop the end of the first shaft portion or the end of the second shaft portion.

According to the embodiments of the present disclosure, the flywheel energy storage device is of a characteristic of large energy storage, achieving the energy storage up to 1000 kilowatt-hours or more, and exhibits excellent load and protection capability in both radial and axial directions once the flywheel rotor loses stability during high-speed rotation, thus providing high safety.

In some embodiments, the first bearing cover, the second bearing cover and the third bearing are movable relative to the housing, and the limit assembly includes a buffer, adapted to apply a force to the first bearing cover or the second bearing cover to buffer an impact of the flywheel rotor.

In some embodiments, the first bearing cover is arranged between the flywheel rotor and the second bearing cover, wherein one of the second bearing cover and the housing is provided with a guide portion, and another one of the second bearing cover and the housing is provided with a slot, wherein the guide portion is fit to the slot and guiding-movable in the slot.

In some embodiments, the flywheel energy storage device includes a first magnetic assembly and a second magnetic assembly, wherein the first magnetic assembly and the first shaft portion are positioned at the same side of the rotor portion, and the second magnetic assembly and the second shaft portion are positioned at the same side of the rotor portion, wherein the first magnetic assembly includes a first magnet and a second magnet, wherein one of the first magnet and the second magnet is arranged at the housing, and another one of the first magnet and the second magnet is arranged at the flywheel rotor, wherein the second magnetic assembly includes a third magnet and a fourth magnet, wherein one of the third magnet and the fourth magnet is arranged at the housing, and another one of the third magnet and the fourth magnet is arranged at the flywheel rotor, wherein a magnetic force is generated between the first magnet and the second magnet and between the third magnet and the fourth magnet, thereby enabling the flywheel rotor to levitate in the installation chamber.

In some embodiments, the flywheel energy storage device includes a damper, arranged at the housing and adapted to apply a buffering force to the flywheel rotor once the flywheel rotor loses stability.

In some embodiments, the flywheel energy storage device includes a motor, fit over the outer circumference of the first shaft portion, wherein the housing defines a projection portion, protruding towards an outer side of the housing and forming an empty groove inside the housing, and at least part of the motor is accommodated in the empty groove.

In some embodiments, the flywheel energy storage device includes a cooling hood and a fan, wherein the cooling hood is arranged to shield an outer circumference of the projection portion, wherein a cooling channel is formed between the cooling hood and the projection portion, wherein the fan is arranged inside the cooling hood and adapted to drive a cooling airflow to flow into the cooling channel, wherein the cooling hood is provided with an air outlet, adapted to allow the cooling airflow to flow out of the cooling hood.

In some embodiments, the flywheel energy storage device includes a first magnetic bearing and a second magnetic bearing, wherein the first magnetic bearing includes a first rotor portion and a first stator portion, wherein the first rotor portion is fit over the outer circumference of the first shaft portion and is rotatable synchronously with the flywheel rotor, wherein the first stator portion is arranged to surround an outer circumference of the first rotor portion, wherein a distance between the first stator portion and the first rotor portion is greater than a distance between the first shaft portion and the first bearing, wherein the second magnetic bearing includes a second rotor portion and a second stator portion, wherein the second rotor portion is fit over the outer circumference of the second shaft portion and is rotatable synchronously with the flywheel rotor, wherein the second stator portion is arranged to surround an outer circumference of the second rotor portion, and wherein a distance between the second stator portion and the second rotor portion is greater than a distance between the second shaft portion and the second bearing.

In some embodiments, the first magnetic bearing and the second magnetic bearing are positioned between the first bearing and the second bearing.

Figure 1:
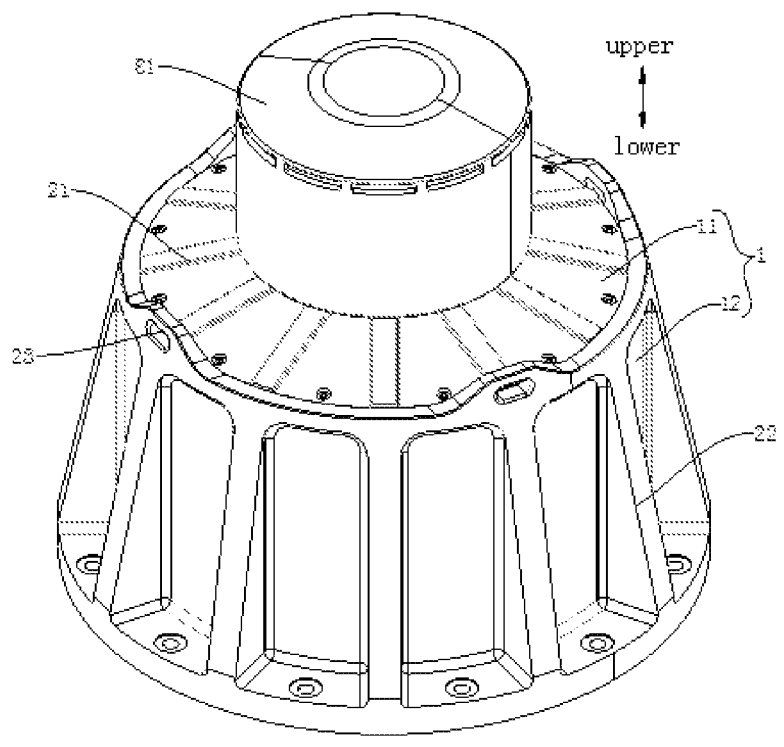
FIG. 1 is a schematic diagram showing a three-dimensional structure of a flywheel energy storage device in an embodiment of the present disclosure.

REFERENCE SIGNS a housing 1; an upper housing 11; a projection portion 111; a base 12; a lower end cover 121;
a first reinforcing rib 21; a second reinforcing rib 22; a lifting lug 23;
a flywheel rotor 3; a rotor portion 31; a first shaft portion 32; a second shaft portion 33;
a first bearing 41; a second bearing 42;
a limit assembly 5; a first bearing cover 51; a second bearing cover 52; a third bearing 53; a buffer 54; a guide portion 55;
a first magnetic assembly 61; a first magnet 611; a second magnet 612; a second magnetic assembly 62; a third magnet 621; a fourth magnet 622; a damper 63;
a motor 7; a motor stator 71; a motor rotor 72;
a cooling hood 81; a fan 82; an air outlet 83; an air inlet 84;

a first magnetic bearing 91; a first rotor portion 911; a first stator portion 912; a second magnetic bearing 92; a second rotor portion 921; a second stator portion 922.

DETAILED DESCRIPTION

The embodiments of the present disclosure are described in detail below, and examples of the embodiments are shown in the accompanying drawings. The embodiments described below with reference to the accompanying drawings are illustrative and are intended to explain the present disclosure, but cannot be understood as limiting the present disclosure.

The embodiments of the present disclosure are made based on the inventor's founding and understanding of the following facts and problems.

All energy storage flywheels with a large amount of electric quantity need to have large rotational inertia and high rotational speed, with a new problem emerging accordingly however. A certain safety problem comes up with an increasing weight, where a large risk results from high energy storage once a flywheel rotor loses stability; while no reliable and stable protection measures exist in the related art.

Figure 2:
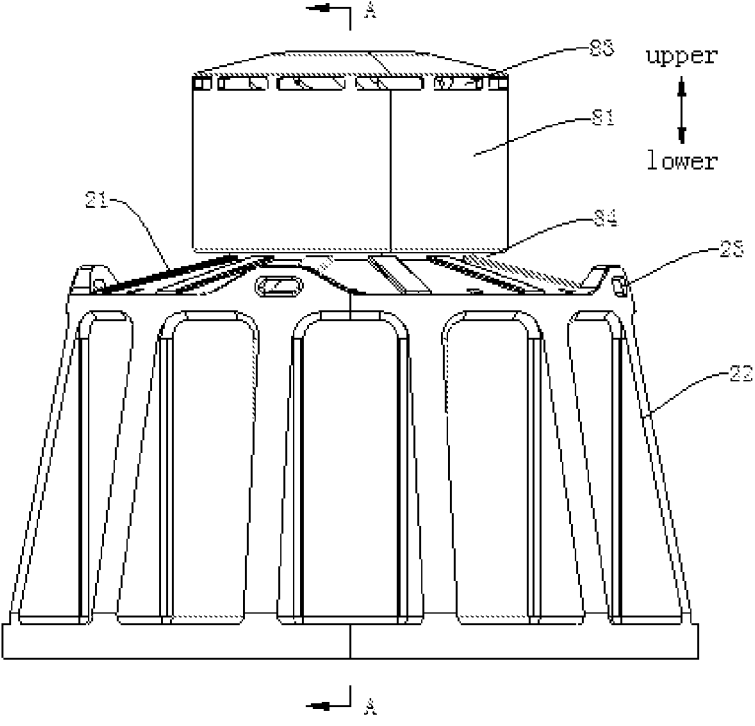
FIG. 2 is a schematic diagram showing a structure of a flywheel energy storage device in an embodiment of the present disclosure.

As shown in FIG. 1 and FIG. 2, in an embodiment of the present disclosure, the flywheel energy storage device includes a housing 1 defining an installation chamber.

In specific, the housing 1 may be formed by connecting the upper housing 11 and the base 12 by a bolt structure. The upper housing 11 may be arranged at the top of the base 12, and the installation chamber is formed between the upper housing 11 and the base 12. The installation chamber may be a vacuum environment, which effectively reduces an energy loss caused by air resistance during operation of the flywheel energy storage device. The outer circumference of the upper housing 11 may be provided with a plurality of the first reinforcing ribs 21, and the outer circumference of the base 12 may be provided with a plurality of the second reinforcing ribs 22. The distance between the top end of the second reinforcing rib 22 and the upper end of the base 12 is less than the distance between the bottom end of the second reinforcing rib 22 and the lower end of the base 12, thus improving the strengthening effect on the housing 1. The upper edge of the bases 12 may be provided with several lifting lugs 23, thus facilitating carrying and hoisting of the flywheel energy storage device. The upper housing 11 and the first reinforcing rib 21 may be integrally formed; the base 12 and the second reinforcing rib 22 may be integrally formed; and the base 12 and the lifting lug 23 may be integrally formed.

It would be appreciated that, in some other embodiments, the lifting lug 23 may also be arranged at the upper housing 11. Besides, the upper housing 11 and the first reinforcing rib 21 may also be fixedly connected by welding; the base 12 and the second reinforcing rib 22 may also be fixedly connected by welding; and the base 12 and the lifting lug 23 may also be fixedly connected by welding.

The flywheel rotor 3 is arranged in the installation chamber and is rotatable in the installation chamber. The flywheel rotor 3 includes a rotor portion 31, a first shaft portion 32 and a second shaft portion 33. The first shaft portion 32 is positioned at one side of the rotor portion 31, and the second shaft portion 33 is positioned at another side of the rotor portion 31. The first shaft portion 32 and the second shaft portion 33 are arranged coaxially.

Figure 3:
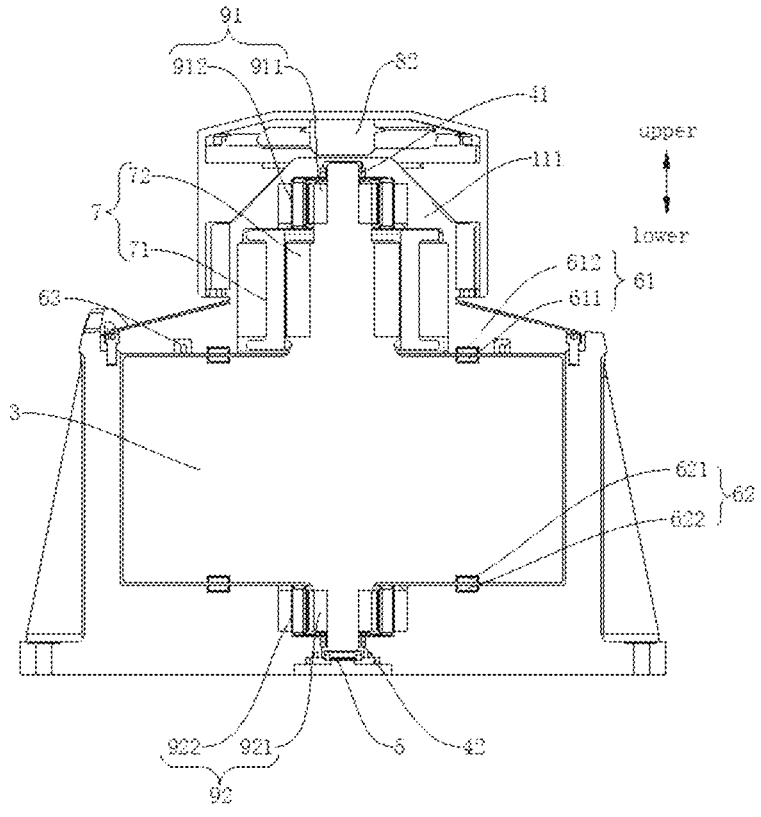
FIG. 3 is a schematic diagram showing a cross-section structure along the A direction shown in FIG. 2.
Figure 4:
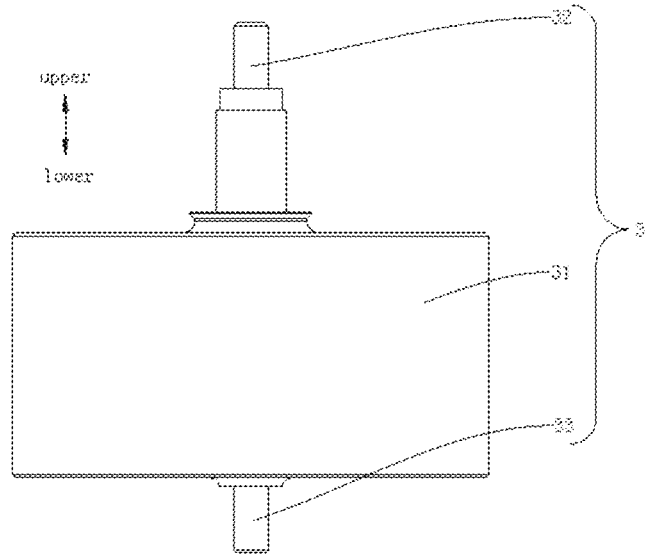
FIG. 4 is a schematic diagram showing a structure of a flywheel rotor in an embodiment of the present disclosure.

In specific, as shown in FIG. 3 and FIG. 4, in an embodiment of the present disclosure, the flywheel rotor 3 is vertically arranged in an axial direction, wherein the first shaft portion 32 is arranged at the upper side of the rotor portion 31, the second shaft portion 33 is arranged at the lower side of the rotor portion 31, and the first shaft portion 32 and the second shaft portion 33 are arranged coaxially. The rotor portion 31, the first shaft portion 32, and the second shaft portion 33 may be formed by an integrated molding process.

It would be appreciated that, in some other embodiments, the flywheel rotor 3 may also be formed by fixedly connecting the shaft and the rotor portion 31, where the shaft is arranged to fixedly penetrate the flywheel rotor 3, a first part of the shaft protruding towards the upper side of the rotor portion 31 is the first shaft portion 32 and a second part of the shaft protruding towards the lower side of the rotor portion 31 is the second shaft portion 33.

The first bearing 41 is arranged at the housing 1 and is arranged to surround the outer circumference of the first shaft portion 32. The second bearing 42 is arranged at the housing 1 and is arranged to surround the outer circumference of the second shaft portion 33.

In specific, as shown in FIG. 3, the first bearing 41 is arranged inside the installation chamber corresponding to the upper housing 11, and is movably fit over the first shaft portion 32. The outer ring of the first bearing 41 is fixedly connected to the inner wall of the upper housing 11, and the inner ring of the first bearing 41 is space from the first shaft portion 32. The second bearing 42 is arranged inside the installation chamber corresponding to the based 12, and is movably fit over the second shaft portion 33. The outer ring of the second bearing 42 is fixedly connected to the inner wall of the base 12, and the inner ring of the second bearing 42 is space from the second shaft portion 33. The first bearing 41 and the second bearing 42 each may be a face-to-face paired or back-to-back paired angular contact bearing. Once the flywheel rotor 3 rotating at a high speed loses stability in the radial direction, the first bearing 41 and the second bearing 42 may stop the first shaft portion 32 and the second shaft portion 33, respectively, thus providing protection on other structures in the housing 1.

It would be appreciated that, in some other embodiments, the first bearing 41 and the second bearing 42 may also be a deep groove ball bearing.

The limit assembly 5 is arranged at the end of the first shaft portion 32 or the end of the second shaft portion 33. The limit assembly 5 is adapted to stop the end of the first shaft portion 32 or the end of the second shaft portion 33 to constrain displacement of the flywheel rotor 3 during the flywheel rotor 3 moving along the axial direction.

In specific, as shown in FIG. 3, the limit assembly 5 is arranged below the bottom end of the second shaft portion 33. Once the flywheel rotor 3 rotating at a high speed loses stability in the axial direction and falls down, the limit assembly 5 may stop the flywheel rotor 3 for stop-buffering, thus providing protection on other structures of the housing 1.

According to the embodiments of the present disclosure, the flywheel energy storage device is of a characteristic of large energy storage, achieving the energy storage up to 1000 kilowatt-hours or more, and exhibits excellent load and protection capability in both radial and axial directions once the flywheel rotor 3 loses stability during high-speed rotation, thus providing high safety.

In some embodiments, the limit assembly 5 includes a first bearing cover 51, a second bearing cover 52 and a third bearing 53; the third bearing 53 includes a first bearing ring and a second bearing ring, which are movable relative to each other; one of the first bearing cover 51 and the second bearing cover 52 is connected to the first bearing ring, and another one of the first bearing cover 51 and the second bearing cover 52 is connected to the second bearing ring; and one of the first bearing cover 51 and the second bearing cover 52 is adapted to stop the end of the first shaft portion 32 or the end of the second shaft portion 33.

Figure 5:
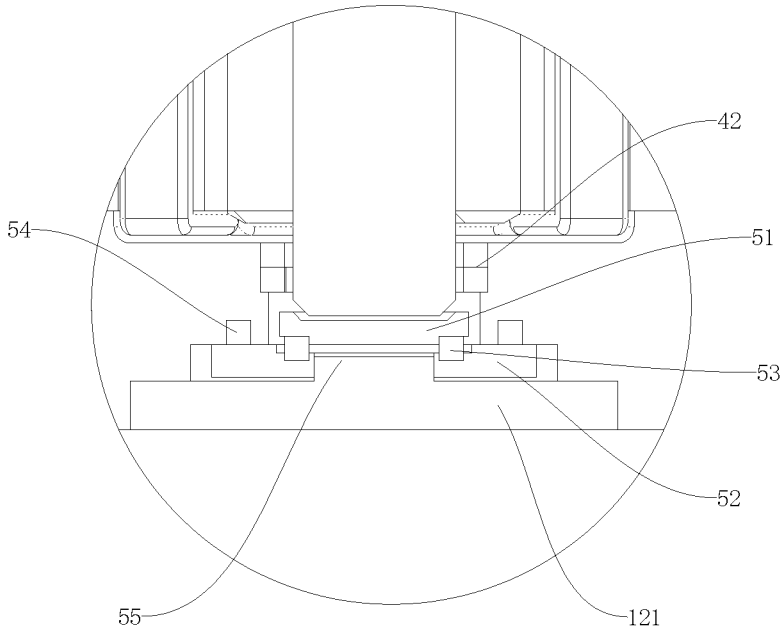
FIG. 5 is a schematic diagram showing an enlarged cross-section structure at a limit assembly in an embodiment of the present disclosure.

In specific, as shown in FIG. 5, the bearing ring above the balls inside the third bearing 53 is referred to as the first bearing ring; the bearing cover above the first bearing ring is referred to as the first bearing cover 51; and the first bearing cover 51 and the first bearing ring may be fixedly connected. The bearing ring below the balls inside the third bearing 53 is referred to as the second bearing ring; the bearing cover below the second bearing ring is referred to as the second bearing cover 52; and the second bearing cover 52 and the second bearing ring may be fixedly connected. The first bearing ring and the second bearing ring may be movable relative to each other in the horizontal direction. The third bearing 53 may be a thrust bearing, which is a bearing dedicated to bear a force in the axial direction. The end of the second shaft portion 33 is positioned above the first bearing cover 51; the end of the second shaft portion 33 may be provided with a chamfer; and the upper part of the first bearing cover 51 may be provided with a groove adapted to the end of the second shaft portion 33, so that the first bearing cover 51 stops the flywheel rotor 3 in a better way once the flywheel rotor 3 rotating at a high speed loses stability in the axial direction and falls down, thus avoiding other structures in the housing 1 from damage.

In some embodiments, the first bearing cover 51, the second bearing cover 52 and the third bearing 53 may be movable relative to the housing 1; the limit assembly 5 includes a buffer 54, adapted to apply a force to the first bearing cover 51 or the second bearing cover 52 to buffer an impact of the flywheel rotor 3.

In specific, as shown in FIG. 5, the buffer 54 may be an annular permanent magnet, which is adsorbed at the upper part of the second bearing cover 52. The base 12 may be provided with an installation slot that is fit with the annular permanent magnet; and the annular permanent magnet is fixedly arranged in the installation slot. Once the flywheel rotor 3 rotating at a high speed loses stability in the axial direction and falls down onto the first bearing cover 51 to drive the first bearing cover 51, the second bearing cover 52, and the third bearing 53 to move downwards, the annular permanent magnet exhibits an upward suction force on the second bearing cover 52, providing a buffering effect for the impact of the flywheel rotor 3, thus effectively avoiding other structures in the housing 1 from damage.

It would be appreciated that, in some other embodiments, the buffer 54 may be a structure composed of a plurality of block-shaped permanent magnets, for providing adsorption to the second bearing cover 52.

It would be appreciated that, in some other embodiments, the buffer 54 may also be a spring, which may be arranged at the upper part of the second bearing cover 52 or at the lower part of the second bearing cover 52, which may still provide the buffering effect for the impact of the flywheel rotor 3.

In some embodiments, the first bearing cover 51 is arranged between the flywheel rotor 3 and the second bearing cover 52, wherein one of the second bearing cover 52 and the housing 1 is provided with a guide portion 55, and another one of the second bearing cover 52 and the housing 1 is provided with a slot, wherein the guide portion 55 is fit to the slot and guiding-movable in the slot.

In specific, as shown in FIG. 5, the bottom part of the base 12 may be provided with a lower end cover 121, which may be detachably connected to the bases 12 by a bolt structure. The upper part of the lower end cover 121 may be provided with the guide portion 55, the second bearing cover 52 may be provided with a slot therein, and the guide portion 55 is arranged to fit to the slot, thus facilitating the first bearing cover 51, the second bearing cover 52 and the third bearing 53 to move downwards. Besides, a certain friction is generated between the guide portion 55 and the inner wall of the slot within the second bearing cover 52, thus providing the certain buffering effect once the first bearing cover 51, the second bearing cover 52 and the third bearing 53 move downwards. In addition, the detachably connected lower end cover 121 facilitates the installation, removal, replacement and maintenance of the limit assembly 5.

It would be appreciated that, in some other embodiments, the guide portion 55 may also be arranged at the second bearing cover 52, and the slot fit with the guide portion 55 may be arranged at the lower end cover 121.

In some embodiments, the flywheel energy storage device includes a first magnetic assembly 61 and a second magnetic assembly 62, wherein the first magnetic assembly 61 and the first shaft portion 32 are positioned at the same side of the rotor portion 31, and the second magnetic assembly 62 and the second shaft portion 33 are positioned at the same side of the rotor portion 31, wherein the first magnetic assembly 61 includes a first magnet 611 and a second magnet 612, wherein one of the first magnet 611 and the second magnet 612 is arranged at the housing 1, and another one of the first magnet 611 and the second magnet 612 is arranged at the flywheel rotor 3, wherein the second magnetic assembly 62 includes a third magnet 621 and a fourth magnet 622, wherein one of the third magnet 621 and the fourth magnet 622 is arranged at the housing 1, and another one of the third magnet 621 and the fourth magnet 622 is arranged at the flywheel rotor 3, wherein a magnetic force is generated between the first magnet 611 and the second magnet 612 and between the third magnet 621 and the fourth magnet 622, thereby enabling the flywheel rotor 3 to levitate in the installation chamber.

In specific, as shown in FIG. 3, the first magnetic assembly 61 is arranged at the upper side of the rotor portion 31; the first magnet 611 and the second magnet 612 each may be an annular structure and arranged oppositely; the upper part of the rotor portion 31 may be provided with a first installation slot fit with the first magnet 611; the first magnet 611 is fixedly installed in the first installation slot; one side surface facing the upper surface of the rotor portion 31 in the upper housing 11 may be provided with a second installation slot fit with the second magnet 612; the second magnet 612 is fixedly installed in the second installation slot; the second magnet assembly 62 is arranged at the lower side of the rotor portion 31; the third magnet 621 and the fourth magnet 622 each may be an annular structure and arranged oppositely; the lower part of the rotor portion 31 may be provided with a third installation slot fit with the third magnet 621; the third magnet 621 is fixedly installed in the third installation slot; one side surface facing the lower surface of the rotor portion 31 in the base 12 may be provided with a fourth installation slot fit with the fourth magnet 622; the fourth magnet 622 is fixedly installed in the fourth installation slot; and an repulsive force is generated between the first magnet 611 and the second magnet 612, and the third magnet 621 and the fourth magnet 622, thereby enabling the flywheel rotor 3 to levitate in the installation chamber. The first magnetic assembly 61 and the second magnetic assembly 62 each may be a passive magnetic bearing, which greatly reduces the energy loss of the flywheel energy storage device during operation compared with an electromagnetic bearing. The passive magnetic bearing is arranged at both side of the flywheel rotor 3, thus improving stability of the flywheel rotor 3 during rotation and reducing occurrence of axial instability of the flywheel rotor 3, and providing high safety.

In some embodiments, the flywheel energy storage device includes a damper 63, arranged at the housing 1 and adapted to apply a buffering force to the flywheel rotor 3 once the flywheel rotor loses stability.

In specific, as shown in FIG. 3, one side surface facing the upper surface of the flywheel rotor 3 in the upper housing 11 may also be provided with an additional installation slot; the damper 63 is fixedly installed in the additional installation slot. The damper 63 may be an electromagnetic damper, capable of applying a force to the flywheel rotor 3 and promote the flywheel rotor 3 to achieve a more stable status rapidly during rotation, thus improving the energy storage capacity of the flywheel energy storage device.

In some embodiments, the flywheel energy storage device includes a motor 7, fit over the outer circumference of the first shaft portion 32, wherein the housing 1 defines a projection portion 111, protruding towards an outer side of the housing 1 and forming an empty groove inside the housing 1, and at least part of the motor 7 is accommodated in the empty groove.

In specific, as shown in FIG. 3, the upper part of the upper housing 11 is provided with the projection portion 111; the empty groove is positioned within the upper housing 11; the motor 7 includes a motor stator 71 and a motor rotor 72; the motor rotor 72 is fixedly connected to the first shaft portion 32; the motor stator 71 is fixedly connected to the inner wall of the upper housing 11; and the motor rotor 72 and the motor stator 71 are fit to each other in the empty groove.

It would be appreciated that, in some other embodiments, only respective upper parts of the motor rotor 72 and the motor stator 71 may also be fit to each other inside the empty groove.

In some embodiments, the flywheel energy storage device includes a cooling hood 81 and a fan 82, wherein the cooling hood 81 is arranged to shield an outer circumference of the projection portion 111, wherein a cooling channel is formed between the cooling hood 81 and the projection portion 111, wherein the fan 82 is arranged inside the cooling hood 81 and adapted to drive a cooling airflow to flow into the cooling channel, wherein the cooling hood 81 is provided with an air outlet 83, adapted to allow the cooling airflow to flow out of the cooling hood 81.

In specific, as shown in FIG. 2 and FIG. 3, the cooling hood 81 is arranged to shield the outer circumference of the projection portion 111; the fan 82 is arranged inside the cooling hood 81 and positioned above the projection portion 111; the airflow channel is formed between the cooling hood 81 and the projection portion 111; the air inlet 84 may be arranged between the lower edge of the cooling hood 81 and the upper housing 11; the air outlet 83 may be arranged at the top of the circumference of the cooling hood 81, thus promoting the cooling airflow to enter the cooling channel via the air inlet 84 and to flow out from the air outlet 83 during operation of the fan 82, so that the fan 82 facilitates to the rapid cooling of the motor 7 during operation of the flywheel energy storage device, thereby improving service life.

It would be appreciated that, in some other embodiments, the air inlet 84 may also be arranged at the top of the circumference of the cooling hood 81, and the air outlet 83 of the cooling airflow may be arranged between the lower edge of the cooling hood 81 and the upper housing 11.

In some embodiments, the flywheel energy storage device includes a first magnetic bearing 91 and a second magnetic bearing 92, wherein the first magnetic bearing 91 includes a first rotor portion 911 and a first stator portion 912, wherein the first rotor portion 911 is fit over the outer circumference of the first shaft portion 32 and is rotatable synchronously with the flywheel rotor 3, wherein the first stator portion 912 is arranged to surround an outer circumference of the first rotor portion 911, wherein a distance between the first stator portion 912 and the first rotor portion 911 is greater than a distance between the first shaft portion 32 and the first bearing 41, wherein the second magnetic bearing 92 includes a second rotor portion 921 and a second stator portion 922, wherein the second rotor portion 921 is fit over the outer circumference of the second shaft portion 33 and is rotatable synchronously with the flywheel rotor 3, wherein the second stator portion 922 is arranged to surround an outer circumference of the second rotor portion 921, and wherein a distance between the second stator portion 922 and the second rotor portion 921 is greater than a distance between the second shaft portion 33 and the second bearing 42.

In specific, as shown in FIG. 3, the first magnetic bearing 91 is arranged above the motor 7, the first rotor portion 911 is fit over the first shaft portion 32 and fixedly connected to the first shaft portion 32; the first stator portion 912 is arranged to surround the outer circumference of the first rotor portion 911 and fixedly connected to the inner wall of the upper housing 11; the distance between the first stator portion 912 and the first rotor portion 911 is greater than the distance between the first shaft portion 32 and the first bearing 41; the second rotor portion 921 is fit over the second shaft portion 33 and fixedly connected to the second shaft portion 33; the second stator portion 922 is arranged to surround the outer circumference of the second rotor portion 921 and fixedly connected to the inner wall of the base 12; and the distance between the second stator portion 922 and the second rotor portion 921 is greater than the distance between the second shaft portion 33 and the second bearing 42. The first magnetic bearing 91 and the second magnetic bearing 92 each may be a permanent magnet biased hybrid magnetic bearing. With the first magnetic bearing 91 and the second magnetic bearing 92, when the flywheel rotor 3 rotating at a high speed loses stability in the radial direction, the first bearing 41 and the second bearing may provide protection on the first magnetic bearing 91 and the second magnetic bearing 92, thereby effectively avoiding damage resulted from collision between the first rotor portion 911 and the first stator portion 912, and between the second rotor portion 921 and the second stator portion 922.

It would be appreciated that, in some other embodiments, the first magnetic bearing 91 and the second magnetic bearing 92 each may be an electromagnetic bearing.

In some embodiments, the first magnetic bearing 91 and the second magnetic bearing 92 are positioned between the first bearing 41 and the second bearing 42.

In specific, as shown in FIG. 3, the first magnetic bearing 91 is arranged between the first bearing 41 and the motor 7; the second magnetic bearing 92 is arranged between the rotor portion 31 and the second bearing 42, so that this configuration promotes the first shaft 32 and the second shaft 33 to contact with the protective first bearing 41 and the protective second bearing 42 at a less offset distance once the flywheel rotor 3 loses stability in the radical direction, thus improving protection on the flywheel rotor 3 in the radical direction.

In the description of the present disclosure, it should be understood that, the terms indicating orientation or position relationship such as "central", "longitudinal", "lateral", "length", "width", "thickness", "above", "below", "front", "rear", "right", "left", "vertical", "horizontal", "top", "bottom", "inner", "outer", "clockwise", "counter-clockwise", "axial", "radial", "circumferential" and the like should be construed to refer to the orientation or position relationship as described or as shown in the drawings. These terms are merely for convenience and concision of description and do not alone indicate or imply that the device or element referred to must have a particular orientation or must be configured or operated in a particular orientation. Thus, it cannot be understood to limit the present disclosure.

In addition, the terms such as "first" and "second" are used herein for purposes of description and are not intended to indicate or imply relative importance or significance or impliedly indicate quantity of the technical feature referred to. Thus, the feature defined with "first" or "second" may explicitly or impliedly comprise at least one of these features. In the description of the present disclosure, "a plurality of" means at least two of these features, for example, two, three, etc. of the features, unless specified otherwise.

In the present disclosure, unless specified or limited otherwise, the terms "mounted", "connected", "coupled", "fixed" and the like are used broadly, and may be, for example, a fixed connection, a detachable connection, or an integrated connection; may also be a mechanical connection, an electrical connection or a mutual communicating connection; may also be a direct connection or an indirect connection via an intervening structure; may also be an inner communication between two elements or a mutual interaction between two elements, unless specified otherwise. Those skilled in the art can understand the specific meaning of the above terms in the present disclosure according to a specific situation.

In the present disclosure, unless specified or limited otherwise, a structure in which a first feature is "on" or "below" a second feature may be an embodiment in which the first feature is in direct contact with the second feature, or an embodiment in which the first feature and the second feature are contacted indirectly via an intervening structure. Furthermore, a first feature "on", "above" or "on top of" a second feature may be an embodiment in which the first feature is right or obliquely "on", "above" or "on top of" the second feature, or merely means that the first feature is at a height higher than that of the second feature; while a first feature "below", "under" or "on bottom of" a second feature may be an embodiment in which the first feature is right or obliquely "below", "under" or "on bottom of" the second feature, or merely means that the first feature is at a height lower than that of the second feature.

In the present disclosure, reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "an embodiment", "some embodiments", "one embodiment", "another example", "an example", "a specific example" or "some examples" in various places throughout this specification are not necessarily referring to the same embodiment or example of the present disclosure. Furthermore, the particular feature, structure, material, or characteristic referred to may be combined in any suitable manner in one or more embodiments or examples. In addition, without contradiction, those skilled in the art may combine different embodiments or examples described in this specification and features in different embodiments or examples.

Although explanatory embodiments have been shown and described, it would be appreciated by those skilled in the art that the above embodiments are illustrative and cannot be construed to limit the present disclosure, and any change, alternative, and modification can be made in the embodiments within the scope of the present disclosure.

What is claimed is:

1. A flywheel energy storage device, comprising:

a housing, defining an installation chamber;

a flywheel rotor, arranged in the installation chamber and rotatable in the installation chamber, and comprising a rotor portion, a first shaft portion and a second shaft portion, wherein the first shaft portion is positioned at one side of the rotor portion, the second shaft portion is positioned at another side of the rotor portion, and the first shaft portion and the second shaft portion are arranged coaxially;

a first bearing, arranged at the housing and to surround an outer circumference of the first shaft portion;

a second bearing, arranged at the housing and to surround an outer circumference of the second shaft portion; and a limit assembly, arranged at an end of the first shaft portion or an end of the second shaft portion, and adapted to stop the end of the first shaft portion or the end of the second shaft portion to constrain displacement of the flywheel rotor during the flywheel rotor moving along an axial direction, wherein the limit assembly comprises a first bearing cover, a second bearing cover and a third bearing, wherein the third bearing comprises a first bearing ring and a second bearing ring, which are movable relative to each other, wherein one of the first bearing cover and the second bearing cover is connected to the first bearing ring, and another one of the first bearing cover and the second bearing cover is connected to the second bearing ring, and wherein one of the first bearing cover and the second bearing cover is adapted to stop the end of the first shaft portion or the end of the second shaft portion.

2. The flywheel energy storage device according to claim 1, wherein the first bearing cover, the second bearing cover and the third bearing are movable relative to the housing, wherein the limit assembly comprises a buffer, adapted to apply a force to the first bearing cover or the second bearing cover to buffer an impact of the flywheel rotor.

3. The flywheel energy storage device according to claim 2, wherein the first bearing cover is arranged between the flywheel rotor and the second bearing cover, wherein one of the second bearing cover and the housing is provided with a guide portion, and another one of the second bearing cover and the housing is provided with a slot, wherein the guide portion is fit to the slot and guiding-movable in the slot.

4. The flywheel energy storage device according to claim 2, comprising: a first magnetic assembly and a second magnetic assembly, wherein the first magnetic assembly and the first shaft portion are positioned at the same side of the rotor portion, and the second magnetic assembly and the second shaft portion are positioned at the same side of the rotor portion, wherein the first magnetic assembly comprises a first magnet and a second magnet, wherein one of the first magnet and the second magnet is arranged at the housing, and another one of the first magnet and the second magnet is arranged at the flywheel rotor, wherein the second magnetic assembly comprises a third magnet and a fourth magnet, wherein one of the third magnet and the fourth magnet is arranged at the housing, and another one of the third magnet and the fourth magnet is arranged at the flywheel rotor, and wherein a magnetic force is generated between the first magnet and the second magnet and between the third magnet and the fourth magnet, thereby enabling the flywheel rotor to levitate in the installation chamber.

5. The flywheel energy storage device according to claim 2, comprising: a damper, arranged at the housing and adapted to apply a buffering force to the flywheel rotor once the flywheel rotor loses stability.

6. The flywheel energy storage device according to claim 2, comprising: a motor, fit over the outer circumference of the first shaft portion, wherein the housing defines a projection portion, protruding towards an outer side of the housing and forming an empty groove inside the housing, and at least part of the motor is accommodated in the empty groove.

7. The flywheel energy storage device according to claim 2, comprising: a first magnetic bearing and a second magnetic bearing, wherein the first magnetic bearing comprises a first rotor portion and a first stator portion, wherein the first rotor portion is fit over the outer circumference of the first shaft portion and is rotatable synchronously with the flywheel rotor, wherein the first stator portion is arranged to surround an outer circumference of the first rotor portion, wherein a distance between the first stator portion and the first rotor portion is greater than a distance between the first shaft portion and the first bearing, wherein the second magnetic bearing comprises a second rotor portion and a second stator portion, wherein the second rotor portion is fit over the outer circumference of the second shaft portion and is rotatable synchronously with the flywheel rotor, wherein the second stator portion is arranged to surround an outer circumference of the second rotor portion, and wherein a distance between the second stator portion and the second rotor portion is greater than a distance between the second shaft portion and the second bearing.

8. The flywheel energy storage device according to claim 1, comprising: a first magnetic assembly and a second magnetic assembly, wherein the first magnetic assembly and the first shaft portion are positioned at the same side of the rotor portion, and the second magnetic assembly and the second shaft portion are positioned at the same side of the rotor portion, wherein the first magnetic assembly comprises a first magnet and a second magnet, wherein one of the first magnet and the second magnet is arranged at the housing, and another one of the first magnet and the second magnet is arranged at the flywheel rotor, wherein the second magnetic assembly comprises a third magnet and a fourth magnet, wherein one of the third magnet and the fourth magnet is arranged at the housing, and another one of the third magnet and the fourth magnet is arranged at the flywheel rotor, and wherein a magnetic force is generated between the first magnet and the second magnet and between the third magnet and the fourth magnet, thereby enabling the flywheel rotor to levitate in the installation chamber.

9. The flywheel energy storage device according to claim 8, comprising: a damper, arranged at the housing and adapted to apply a buffering force to the flywheel rotor once the flywheel rotor loses stability.

10. The flywheel energy storage device according to claim 8, comprising: a motor, fit over the outer circumference of the first shaft portion, wherein the housing defines a projection portion, protruding towards an outer side of the housing and forming an empty groove inside the housing, and at least part of the motor is accommodated in the empty groove.

11. The flywheel energy storage device according to claim 8, comprising: a first magnetic bearing and a second magnetic bearing, wherein the first magnetic bearing comprises a first rotor portion and a first stator portion, wherein the first rotor portion is fit over the outer circumference of the first shaft portion and is rotatable synchronously with the flywheel rotor, wherein the first stator portion is arranged to surround an outer circumference of the first rotor portion, wherein a distance between the first stator portion and the first rotor portion is greater than a distance between the first shaft portion and the first bearing, wherein the second magnetic bearing comprises a second rotor portion and a second stator portion, wherein the second rotor portion is fit over the outer circumference of the second shaft portion and is rotatable synchronously with the flywheel rotor, wherein the second stator portion is arranged to surround an outer circumference of the second rotor portion, and wherein a distance between the second stator portion and the second rotor portion is greater than a distance between the second shaft portion and the second bearing.

12. The flywheel energy storage device according to claim 1, comprising: a damper, arranged at the housing and adapted to apply a buffering force to the flywheel rotor once the flywheel rotor loses stability.

13. The flywheel energy storage device according to claim 12, comprising: a motor, fit over the outer circumference of the first shaft portion, wherein the housing defines a projection portion, protruding towards an outer side of the housing and forming an empty groove inside the housing, and at least part of the motor is accommodated in the empty groove.

14. The flywheel energy storage device according to claim 12, comprising: a first magnetic bearing and a second magnetic bearing, wherein the first magnetic bearing comprises a first rotor portion and a first stator portion, wherein the first rotor portion is fit over the outer circumference of the first shaft portion and is rotatable synchronously with the flywheel rotor, wherein the first stator portion is arranged to surround an outer circumference of the first rotor portion, wherein a distance between the first stator portion and the first rotor portion is greater than a distance between the first shaft portion and the first bearing, wherein the second magnetic bearing comprises a second rotor portion and a second stator portion, wherein the second rotor portion is fit over the outer circumference of the second shaft portion and is rotatable synchronously with the flywheel rotor, wherein the second stator portion is arranged to surround an outer circumference of the second rotor portion, and wherein a distance between the second stator portion and the second rotor portion is greater than a distance between the second shaft portion and the second bearing.

15. The flywheel energy storage device according to claim 1, comprising: a motor, fit over the outer circumference of the first shaft portion, wherein the housing defines a projection portion, protruding towards an outer side of the housing and forming an empty groove inside the housing, and at least part of the motor is accommodated in the empty groove.

16. The flywheel energy storage device according to claim 15, comprising: a cooling hood and a fan, wherein the cooling hood is arranged to shield an outer circumference of the projection portion, wherein a cooling channel is formed between the cooling hood and the projection portion, wherein the fan is arranged inside the cooling hood and adapted to drive a cooling airflow to flow into the cooling channel, and wherein the cooling hood is provided with an air outlet, adapted to allow the cooling airflow to flow out of the cooling hood.

17. The flywheel energy storage device according to claim 15, comprising: a first magnetic bearing and a second magnetic bearing, wherein the first magnetic bearing comprises a first rotor portion and a first stator portion, wherein the first rotor portion is fit over the outer circumference of the first shaft portion and is rotatable synchronously with the flywheel rotor, wherein the first stator portion is arranged to surround an outer circumference of the first rotor portion, wherein a distance between the first stator portion and the first rotor portion is greater than a distance between the first shaft portion and the first bearing, wherein the second magnetic bearing comprises a second rotor portion and a second stator portion, wherein the second rotor portion is fit over the outer circumference of the second shaft portion and is rotatable synchronously with the flywheel rotor, wherein the second stator portion is arranged to surround an outer circumference of the second rotor portion, and wherein a distance between the second stator portion and the second rotor portion is greater than a distance between the second shaft portion and the second bearing.

18. The flywheel energy storage device according to claim 1, comprising: a first magnetic bearing and a second magnetic bearing, wherein the first magnetic bearing comprises a first rotor portion and a first stator portion, wherein the first rotor portion is fit over the outer circumference of the first shaft portion and is rotatable synchronously with the flywheel rotor, wherein the first stator portion is arranged to surround an outer circumference of the first rotor portion, wherein a distance between the first stator portion and the first rotor portion is greater than a distance between the first shaft portion and the first bearing, wherein the second magnetic bearing comprises a second rotor portion and a second stator portion, wherein the second rotor portion is fit over the outer circumference of the second shaft portion and is rotatable synchronously with the flywheel rotor, wherein the second stator portion is arranged to surround an outer circumference of the second rotor portion, and wherein a distance between the second stator portion and the second rotor portion is greater than a distance between the second shaft portion and the second bearing.

19. The flywheel energy storage device according to claim 18, wherein the first magnetic bearing and the second magnetic bearing are positioned between the first bearing and the second bearing.

* * * * *